Patented Nov. 22, 1949

2,488,546

UNITED STATES PATENT OFFICE 2,488,546

OXIDATION OF UTAH COAL-TYPE RESINS

Ernest D. Lee, Teaneck, and Rupert J. Schefbauer, Jr., Union City, N. J., and Hugh J. Dunn, Hollis, N. Y., assignors to Interchemical Corporation, New York, N. Y., a corporation of Ohio No Drawing. Application March 26, 1948, Serial No. 17,375

3 Claims. (Cl. 260—99)

This invention relates to the process and product of treating resinous hydrocarbon material obtained from resin bearing bituminous coals.

Certain coals, notably the bituminous coal from the Utah coal fields obtained from between Castlegate on the north and Salina Canyon on the south, contain substantial percentages (up to 10%) of resinous material consisting for the most part of carbon and hydrogen. Of the various methods that have been proposed to effect separation of the hydrocarbon resin from the coal, the one involving froth flotation (e. g. U. S. Patent No. 1,773,997) appears to be the most widely used. The coal resin concentrate obtained by this froth flotation technique contains 70–95% of resin. The resinous material is further concentrated by extracting the coal resin concentrate with suitable solvents for the resin, notably hydrocarbon solvents such as petroleum ether, mineral spirits, and the like, to obtain a soluble resin of 95–100% purity.

The exact chemical structure of the complex resinous material obtained by solvent extraction of the coal resin concentrate has never been elucidated. In general appearance it is hard and friable, and is soluble in ordinary hydrocarbon solvents such as petroleum ether, mineral spirits, etc. Other properties, such as iodine number, acid value, molecular weight, melting point, etc., will vary slightly depending upon the particular solvent used to extract the resin. A typical resin, obtained by extracting the coal resin concentrate with commercial n-hexane containing less than 25% of aromatics, has the following characteristics:

| | |
|---|---|
| Color | Dark brown |
| Melting point (capillary) ° C | 160–165 |
| Acid value | 6–8 |
| Iodine value (Wijs) | 100–130 |
| Specific gravity (melted) | 1.04–1.06 |
| Molecular weight (cryoscopic) | 732 |
| Carbon per cent | 87.10 |
| Hydrogen do | 11.17 |
| Sulfur do | .30 |
| Nitrogen do | .96 |
| Ash do | .45 |

The solvent extracted resinous material described hereinabove is undoubtedly a mixture of resins of different molecular weights and possibly different chemical structures or refined to obtain resins. When the resin obtained by extracting coal concentrate with commercial hexane solvent is redissolved in 2-methyl pentane to a concentration of 25 to 50% and then diluted to about 10% concentration, a high melting resin is precipitated while lower melting resins remain in solution. High melting resins obtained in this manner are described in the copending application of E. D. Lee and R. J. Schefbauer, Jr., Serial No. 746,857, filed May 8, 1947.

It has now been discovered that new and useful resinous materials can be obtained from resin bearing coals by exposing resins obtained from coals by solvent extraction, for instance the resins obtained by the manner hereinabove described, to oxygen or oxygen containing gases (e. g. air) at temperatures substantially above room temperature but below the softening point of the particular resin being treated.

The process of the invention is preferably carried out by spreading the resin in finely divided form to a depth of about ¼ to ½ inch and heating the resin in an oven at a temperature of 5 to 15 degrees below the softening point of the resin.

Under the conditions of the process of the invention the coal resin appears to react with oxygen to form oxygenated resins. Also there is evidence that the resin polymerizes to a higher molecular weight, possibly by cross-linkage through its unsaturated groupings. The total gain in weight, apparently due to oxidation of the resin, amounts to a maximum of 6–7%.

The immediate effect noted when a sample of resin is treated with oxygen according to the invention is that there is a slight decrease in weight, generally not more than about 0.5%, based on the original weight of the resin. This decrease in weight is then followed by a gradual increase in weight up to a maximum of 6–7% based on the original resin weight. The effect of this oxygen treatment, as far as oxygen content of the resin is concerned, is to convert the coal resin, which contains practically no oxygen, to a resin containing up to about 6–7% of oxygen. The length of time required to bring about these changes depends upon the particular conditions employed, particularly the temperature. As would be expected, the higher the temperature that is employed, the shorter will be the time required to reach the point of maximum gain in weight.

If the reaction between the resin and oxygen is allowed to go to completion, i. e. to the point of maximum gain in weight, the oxygenated resin becomes insoluble in ordinary petroleum hydrocarbon solvents. Such an insoluble resin has been found to be less useful than a more soluble resin; therefore, for the purposes of the present invention it is preferred not to oxidize the resin to the point where the resin becomes substantially insoluble in the petroleum hydrocarbon solvents such as petroleum ether, mineral spirits and the like.

The iodine value of the coal resin is decreased by the oxygen and heat treatment according to the present process and the extent of such decreases is proportionate to the length of time the treatment is continued at any particular temperature. This indicates that the unsaturated linkages of the resin are destroyed either by oxidation or polymerization or perhaps by both.

Another important effect of the oxgen and heat treatment on the resin is in the marked tendency to increase the melting point of the resin. Generally it is possible to increase the melting point by as much as about 40° C. The high melting resins, especially those that are still soluble in petroleum solvents, are useful in inks, varnishes, lacquers, and the like.

Although the lower temperature limit at which the process of the invention can be carried out is not particularly critical it should be noted that the speed at which the reaction proceeds decreases as the temperature is lowered. For this reason we prefer to carry out the treatment at temperatures of not lower than about 15° C. below the melting point of the resin. As stated hereinabove the upper temperature limit will be just below the softening point of the resin. For example, using a solvent extracted coal resin having a melting point of 160–164° C., our preferred range for practical operating results would be from about 145° to 155° C.

The process of the invention is conveniently carried out by spreading the coal resin in trays to a depth of from about ¼ to ½ inch and then placing the charged trays in a constant temperature oven at the desired temperature and in which the oven chamber is open to the air. Where it is desired to carry out the treatment continuously the resin may be fed onto a horizontally moving belt and then the belt containing the resin at a desired depth can be passed through a heating chamber at such a rate that by the time it leaves the chamber it will have been reacted to the desired extent.

The following examples in which the parts are by weight unless otherwise stated further illustrate the invention:

*Example I*

A sample of coal resin of melting point 160 to 165° C. and obtained by extracting froth flotation resin concentrate with commercial n-hexane was placed in a tray, the depth of the resin being about ½ inch, and heated in a constant temperature oven open to the air at 150° C. for 12 hours. The melting point of the resulting product was 195° to 200° C. A 50% solution of the resin in ink solvent (petroleum hydrocarbon, B. P. 245° to 259° C., Kauri Butanol value 26, dimethyl sulfate value 2.5) had a viscosity of 7,900 poises as compared to 12 poises for a similar solution of the untreated resin.

*Example II*

To follow the progressive changes in the coal resin during the heat treatment process several different samples of the resin were simultaneously heated in air at 150° C. and at regular intervals samples were taken out and tested as to melting point, weight change, and viscosity in ink solvent (same solvent as in Example I). After ½ hour the weight loss was 0.6%, after 3 hours it was only 0.024%, and then there was a gradual increase in weight up to 3.3% at 14 hours of heating. The first viscosity measurements were made after 3 hours (31.9 poises) and the measurements indicated that the viscosity increased gradually up to 12 hours of heating. The viscosity at this point was 450 poises. The next sample, taken after 13 hours of heating, had a viscosity of 9,367 poises and the 14th hour sample had a viscosity of 12,578 poises. Samples taken after this point were thixotropic and finally became insoluble in the ink solvent. Over the range of heating the melting point of the resin gradually increased from 160 to 165° C. up to 210 to 215° C. while the carbon and hydrogen analysis changed from carbon, 87.5%, hydrogen 11.0% to carbon, 80.5%, hydrogen 9.6%.

By carrying out the process at 140° C. it was shown that substantially the same results as above could be obtained except that a longer reaction time was required.

By heating the resin in air at 150° C. until no further change in weight was indicated it was shown that the maximum gain in weight was 6.06%. The time required was 316 hours. The carbon and hydrogen analysis of the product was carbon 73.1%, hydrogen 7.6%. The resin was insoluble in ink solvents.

In an inert atmosphere (e. g. nitrogen) there is no change in weight as the resin is heated and there is no increase in weight or viscosity during the first 40 hours of heating. The melting point increases however, from 160°–165° C. to 192°–197° C. When a slightly oxidized resin was substituted for the untreated resin in this experiment the results were much different. For instance, starting with a partially oxidized resin having a viscosity in 50% solution in ink solvent of 160 poises, there was a gradual increase in melting point up to 204°–209° C. after 100 hours of heating and during this time the viscosity of a 50% ink solvent solution increased from 160 poises up to 4130 poises. These experiments indicate that the modifications brought about by the process of the invention are the result of the action of both oxygen and heat possibly to give an oxidized and polymerized resin.

The modified resins prepared according to the process of the invention are useful in inks, coatings and the like. Due to their good drying properties they are especially useful in inks that are designed to dry rapidly by application of heat. Inks of this type are described in the co-pending application of E. D. Lee et al, Serial No. 17,376, filed March 26, 1948.

Having described our invention and the manner in which it may be practiced we claim as our invention:

1. In a method of recovering resin from resin-bearing coal of the Utah type wherein the crude resin is separated from the bulk of the coal to produce a resin concentrate of resin admixed with coal and soluble resin is extracted from the resin concentrate with a hydrocarbon solvent, the steps which comprise subjecting the solvent extracted resin to an oxygen containing gas at a temperature of from 5° to 15° C. below the softening point of the resin.

2. In a method of recovering resin from resin-bearing coal of the Utah type wherein the crude resin is separated from the bulk of the coal to produce a resin concentrate of resin admixed with coal and soluble resin is extracted from the resin concentrate with a hydrocarbon solvent, the steps which comprise subjecting the solvent extracted resin in finely divided form to an oxygen containing gas at a temperature of from 5° to 15° C. below the softening point of the resin.

3. As a new resinous material, the oxygen-containing resin resulting from the treatment of a resin obtained from resin-bearing coals of the Utah type with oxygen at a temperature of 5° to 15° C. below the softening point of the resin.

ERNEST D. LEE.
RUPERT J. SCHEFBAUER, Jr.
HUGH J. DUNN.

No references cited.